United States Patent [19]
Johnson

[11] Patent Number: 5,806,556
[45] Date of Patent: Sep. 15, 1998

[54] TURBINE CONTROLLED METERING VALVE

[75] Inventor: Dwight N. Johnson, Carlsbad, Calif.

[73] Assignee: American Standard Inc., Piscataway, N.J.

[21] Appl. No.: 549,999

[22] Filed: Oct. 30, 1995

[51] Int. Cl.⁶ .................................................. F16K 17/34
[52] U.S. Cl. .................... 137/486; 137/489; 137/624.11; 251/20
[58] Field of Search .................. 222/14, 16; 137/624.11, 137/486, 489; 251/15, 20, 22

[56] References Cited

U.S. PATENT DOCUMENTS

| | | |
|---|---|---|
| Re. 22,710 | 1/1946 | Cornell et al. ............................ 222/14 |
| 2,057,333 | 10/1936 | Guibert .................................. 251/15 X |
| 3,902,201 | 9/1975 | Bobo . |
| 4,058,286 | 11/1977 | Berger ....................................... 251/15 |
| 4,418,839 | 12/1983 | Nichols ..................................... 222/14 |
| 4,662,602 | 5/1987 | Johnson . |
| 4,916,762 | 4/1990 | Shaw . |
| 5,065,901 | 11/1991 | Brane et al. ......................... 222/14 X |
| 5,421,361 | 6/1995 | Johnson . |

*Primary Examiner*—Stephen M. Hepperle

[57] ABSTRACT

A metering valve includes a main valve and a pilot valve for operating the main valve. A low operating force pawl and ratchet system rotates a cam to open the pilot valve to initiate a cycle of operation. When the main valve is opened, a turbine wheel in the flow path rotates to measure flow. Turbine rotation is transmitted to the cam through a reducing gear assembly and a lost motion connection in order to reclose the pilot and main valves after a predetermined volume of flow is measured.

19 Claims, 6 Drawing Sheets

TURBINE CONTROLLED METERING VALVE

FIELD OF THE INVENTION

The present invention relates to metering valves for delivering a predetermined volume of liquid, and more particularly to a metering valve having a turbine for measuring flow through the valve.

DESCRIPTION OF THE PRIOR ART

Metering valves are used to supply a measured, predetermined volume of liquid flow in response to a single valve actuation. Valves of this type may be used for flushing water fixtures in commercial systems where relatively high capacity water systems are employed. Typical metering valves use a small flow restriction to control the closing speed of a dash pot type valve member. U.S. Pat. No. 4,662,602 discloses one metering valve of this type. Timing restrictors of conventional metering valves are small and are subject to being plugged or fouled and thus present a maintenance problem.

It has been proposed to use a turbine to measure flow through a valve. A turbine has the advantage that it does not require a small flow restriction to accomplish the flow measurement function. U.S. Pat. Nos. 3,902,201 and 4,916,762 disclose flush tank fill valve systems using flow measurement turbines. Although these systems avoid the use of flow timing restrictors, they are subject to disadvantages including a lack of accurate flow measurement and the need for large actuation forces to open the valve.

SUMMARY OF THE INVENTION

A principal object of the present invention is to provide a metering valve making effective use of a turbine for measuring flow through the valve. Other objects are to provide a metering valve requiring a very small actuating force to open the valve; to provide a metering valve having high metering accuracy across a wide range of liquid flow rates; to provide a metering valve that is not subject to plugging or fouling and that does not present maintenance problems; and to provide a metering valve overcoming disadvantages of known metering valve designs.

In brief, in accordance with the invention there is provided a metering valve including a housing defining a flow path with inlet and outlet regions. A main valve seat defined in the housing separates the inlet and outlet regions. A main valve member moves relative to the main valve seat between open and closed positions. The housing defines a control chamber at the side of the main valve member opposite the seat. A restricted flow passage extends from the inlet region to the control chamber for normally pressurizing the control chamber to hold the main valve member against the main valve seat in the closed position. A pilot valve selectively releases pressure from the control chamber to free the main valve member for movement to the open position. Actuating means opens the pilot valve. A turbine in the flow path rotates in response to flow in the flow path. A control mechanism coupled between the turbine and the pilot valve recloses the pilot valve in response to predetermined rotation of the turbine.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Having reference now to the drawings, there is illustrated a metering valve generally designated as 20 and constructed in accordance with the principles of the present invention. In general, the metering valve 20 includes a housing assembly 22 having an inlet port 24 adapted to be connected with a source of pressurized liquid such as a water supply system and an outlet port 26 adapted to be connected to a liquid utilization device such as a urinal or toilet. A main valve member 28 cooperates with a main valve seat 30 to control flow through the housing 22. Pressure in a control chamber 32 normally closes the main valve member 28. A pilot valve member 34 cooperates with a pilot valve seat 36 and can be opened by an actuator 38 to reduce control chamber pressure, open the main valve member 28 and permit flow through the valve. Flow volume is measured by rotation of a turbine wheel 40. A control mechanism generally designated as 42 recloses the pilot valve member 34 in order to reclose the main valve member after a predetermined volume of flow.

Housing assembly 22 includes a base 44 that is secured to a cap 46 by a threaded retaining ring 48 and sealed by an O-ring 49. Captured within the base 44 and cap 46 is an inlet housing assembly 50 including a body 52 and cover 54. Inlet port 24 is defined at the bottom of the body 52 and outlet port 26 is defined at the bottom of the base 44. A valve cup 56 and an insert 58 are held above the cover 54 and within the cap 46. The main valve seat 30 is defined as a series of flow apertures 59 in a central upper surface of the cup 56 and the pilot valve seat 36 is defined on the cap 46 and surrounds a chamber vent passage 60. The pressure control chamber 32 is defined within the cap 46 around and within the insert 58.

Main valve member 28 is a flexible, resilient element peripherally captured by the cap 46, the insert 58 and the valve cup 56. In the closed position, the main valve member 28 is held against the main valve seat 30 by pressure within the control chamber 32. When the control chamber 32 is vented through the passage 60 by opening of the pilot valve member 34, the main valve member moves to the open position seen in FIG. 2 wherein liquid flows through the main valve seat 30. In many respects the main valve arrangement is similar to that disclosed in U.S. Pat. No. 5,421,361, incorporated here by reference.

When the main valve member 28 is in its open position, liquid flows from the inlet port 24 and then upwardly through the body 52 of the inlet housing assembly 50. Liquid then flows upwardly through a center port 62 in the cover 54, and then downwardly through the series of apertures 59 in the valve cup 56. Port 62 terminates in a lip projecting slightly above the surrounding surface of the valve cup 56 to assure a tight seal when the valve is closed. Downstream flow from the main valve is first downward and then in the upward direction within an annular flange 64 of the cover 54 and then downward again outside of the flange 64 and within an annular wall 66 of the cap 46. A series of apertures 68 are provided in a depending skirt portion 70 of the cover 54, permitting liquid to flow downward between the body 52 and base 44 to the outlet port 26.

Normally the control chamber 32 is maintained at elevated inlet pressure by restricted communication from the inlet region to the chamber 32 through a central orifice 72 in the main valve member 28. A central portion of a drive shaft 74 extends through orifice 72, and has opposed grooves 76 providing restricted flow. Apertures 78 in the insert 58 permit free pressure communication within the chamber 32. Elevated pressure acting on the upper surface of the main valve member 28 normally maintains it in sealing engagement against the main valve seat 30.

Figure 1:
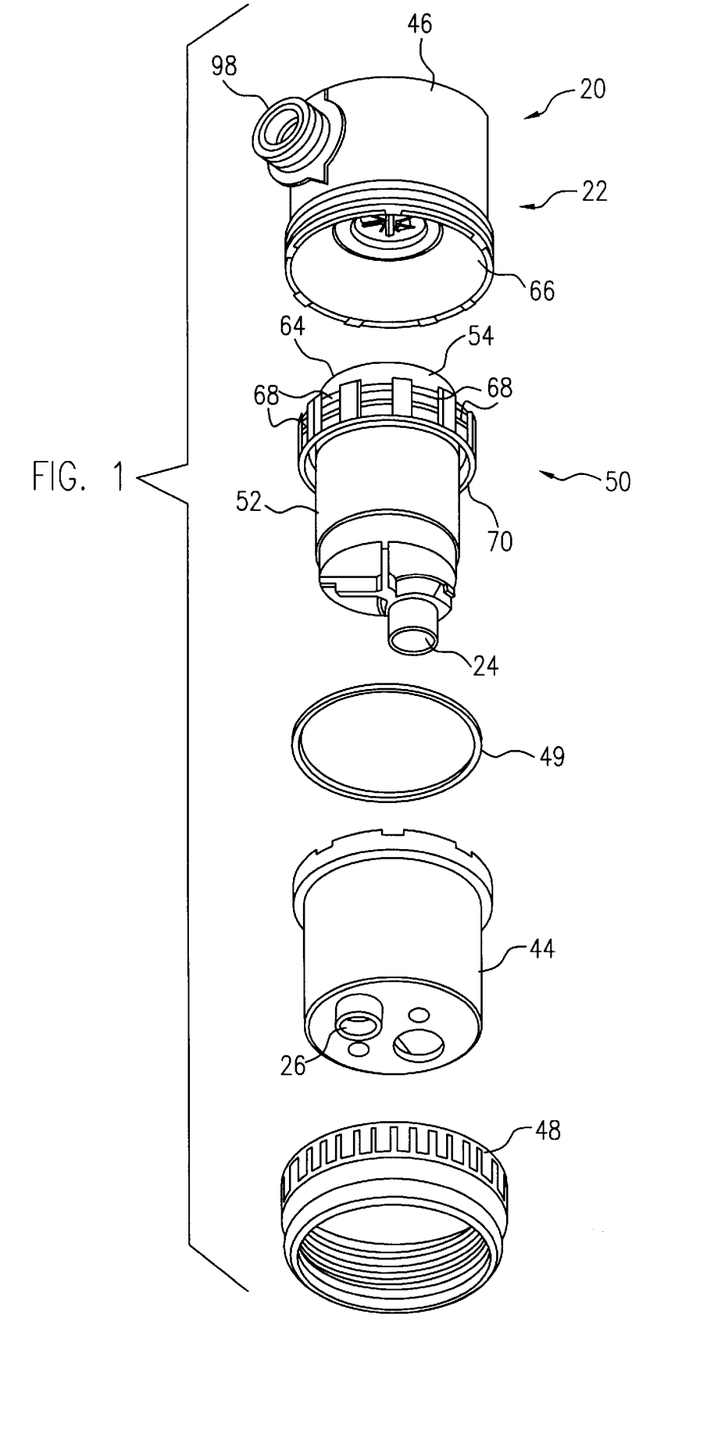
FIG. 1 is an exploded isometric view of the metering valve of the present invention.
Figure 2:
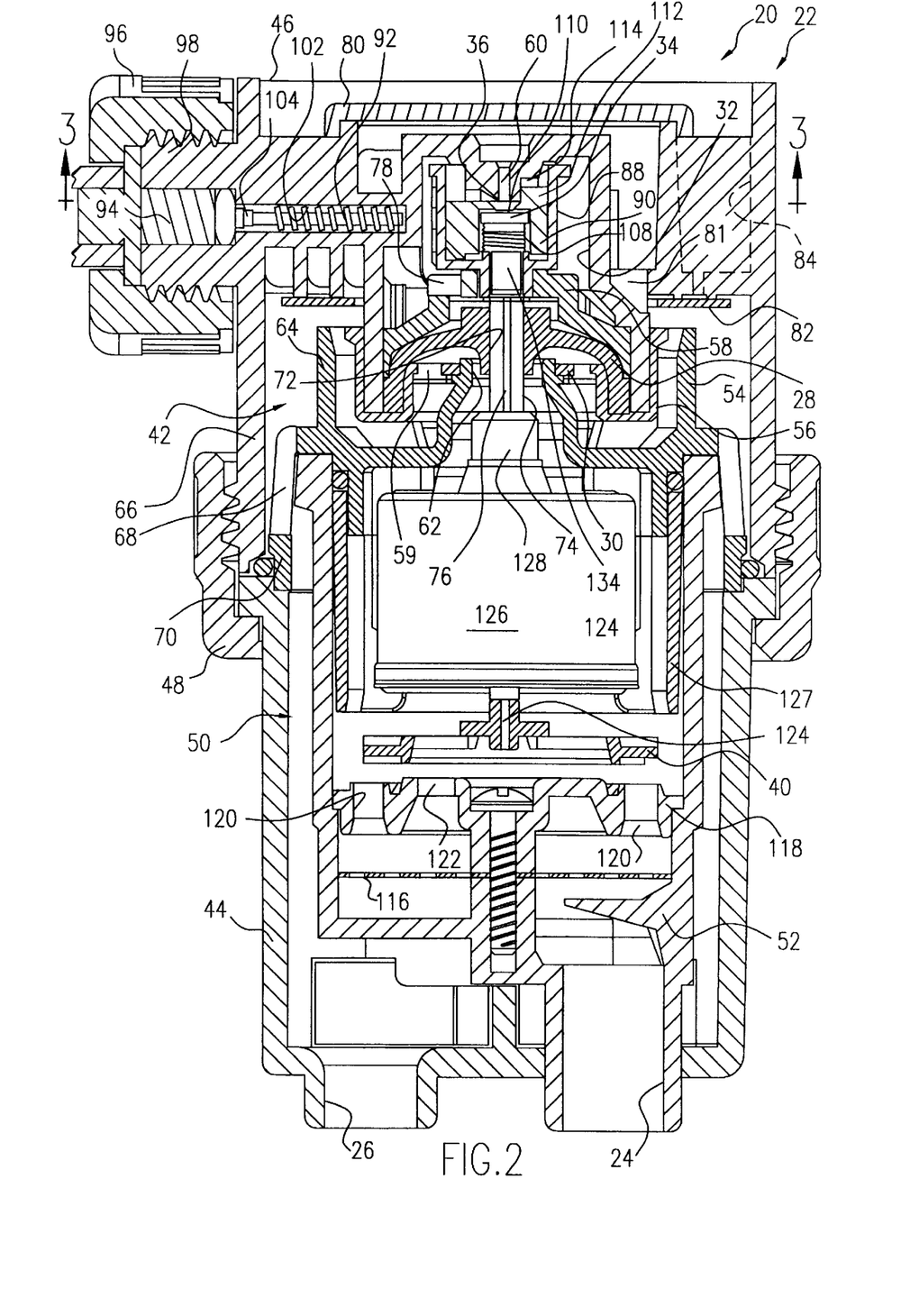
FIG. 2 is a vertical axial sectional view of the assembled metering valve of FIG. 1, taken along the line 2—2 of FIG. 3.

Pilot valve member 34 is moved from its closed position to the open position seen in FIG. 2 in order to permit flow through the metering valve 20. When the pilot valve is opened, pressure within the chamber 32 is vented along a flow path extending from the vent passage 60 in the cap 46 to an upper region sealed by a closure member 80. Liquid flows from this upper region through a port 81 and joins the main valve outlet flow within the annular wall 66 of the cap 46. The vent flow is relatively unrestricted and pressure within the control chamber 32 drops. Inlet pressure acting against the underside of the main valve member 28 causes the main valve member 28 to move to its open position. When the pilot valve member 34 is returned to its closed position, pressure in the control chamber 32 increases due to restricted flow through orifice 72 and the main valve member is closed.

A vacuum breaker washer 82 is received in the cap 46 above the cover 54 and valve cup 56. When the main valve is closed, gravity holds the washer 82 in its lower position where it opens a vent passage 84 extending through the cap 46 to atmosphere. When the main valve is open, the flowing liquid lifts the washer 82 so that it closes the passage 84 and provides a sealed flow path through the metering valve 20 between the inlet and outlet ports 24 and 26.

To initiate a cycle of operation of the metering valve 20, the actuator 38 is depressed by any suitable mechanism such as a manual lever or button or by a remote device coupled electrically or pneumatically to the actuator 38. In the illustrated arrangement the actuator is a push rod, although other mechanisms may be used. When the actuator 38 is depressed (moved to the right as viewed in FIG. 3) it engages a pawl 86 and the pawl 86 rotates a ratchet member 88. Ratchet member 88 rotates a captive pilot valve cam 90, and rotation of the cam 90 results in opening of the pilot valve member 34.

Figure 3:
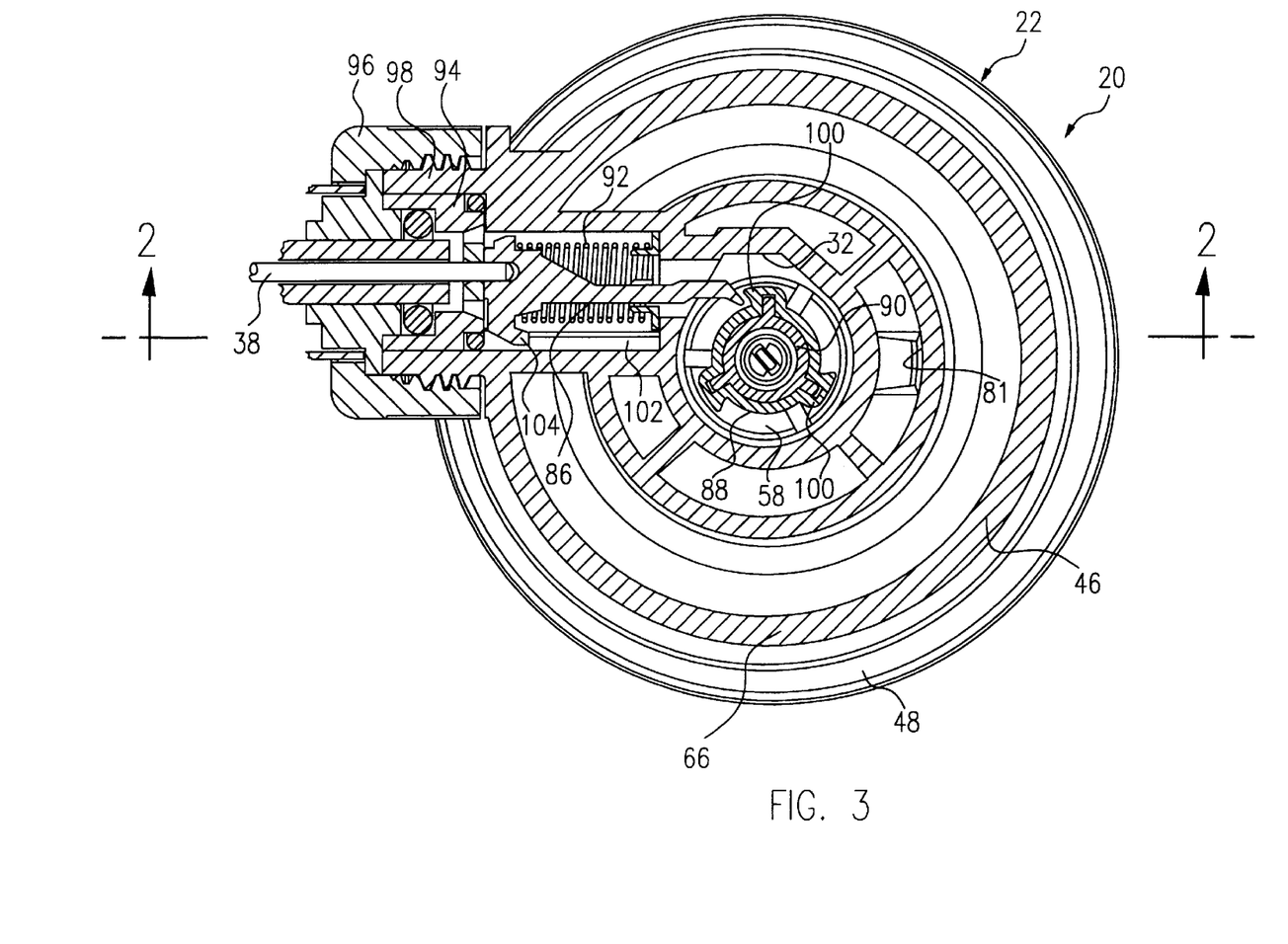
FIG. 3 is a sectional view of the valve taken along the line 3—3 of FIG. 2.

The pawl 86 is biased to a retracted position as seen in FIG. 3 by a pawl spring 92. In this position the pawl 86 stops against a stop member 94 held in place by a nut 96 threaded onto a nipple 98 formed on the cap 46. The center line of the spring 92 is offset relative to the pawl and urges the nose of the pawl into engagement with one of three equally spaced ratchet teeth 100 on the ratchet member 88. A slideway 102 in the cap 46 receives an alignment finger 104 of the pawl to maintain the orientation of the pawl 86. Any frictional drag of the finger 104 in the slideway 102 also tends to locate the pawl nose in engagement with the ratchet tooth 100. When the actuator 38 is withdrawn, the spring 92 returns the pawl to the retracted position.

Figure 9:
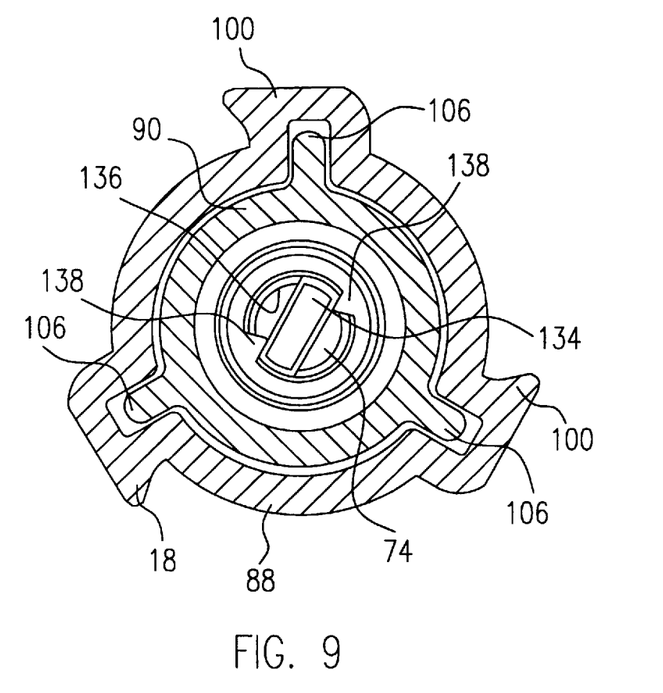
FIG. 9 is an enlarged sectional view like part of FIG. 3 showing portions of the drive shaft, pilot valve cam and ratchet member.

Ribs 106 of the pilot valve cam 90 capture the cam within the ratchet member 88 for simultaneous rotation, while permitting the cam 90 to move axially relative to the ratchet member (FIG. 9). A pilot valve spring 108 captured between the ratchet member 88 and the pilot valve member 34 urges the pilot valve member 34 in the upward direction. In the normal, closed position, the pilot valve member 34 seats against the pilot valve seat 36 that projects down through a clearance opening 110 in the cam 90.

Figures 5, 6:
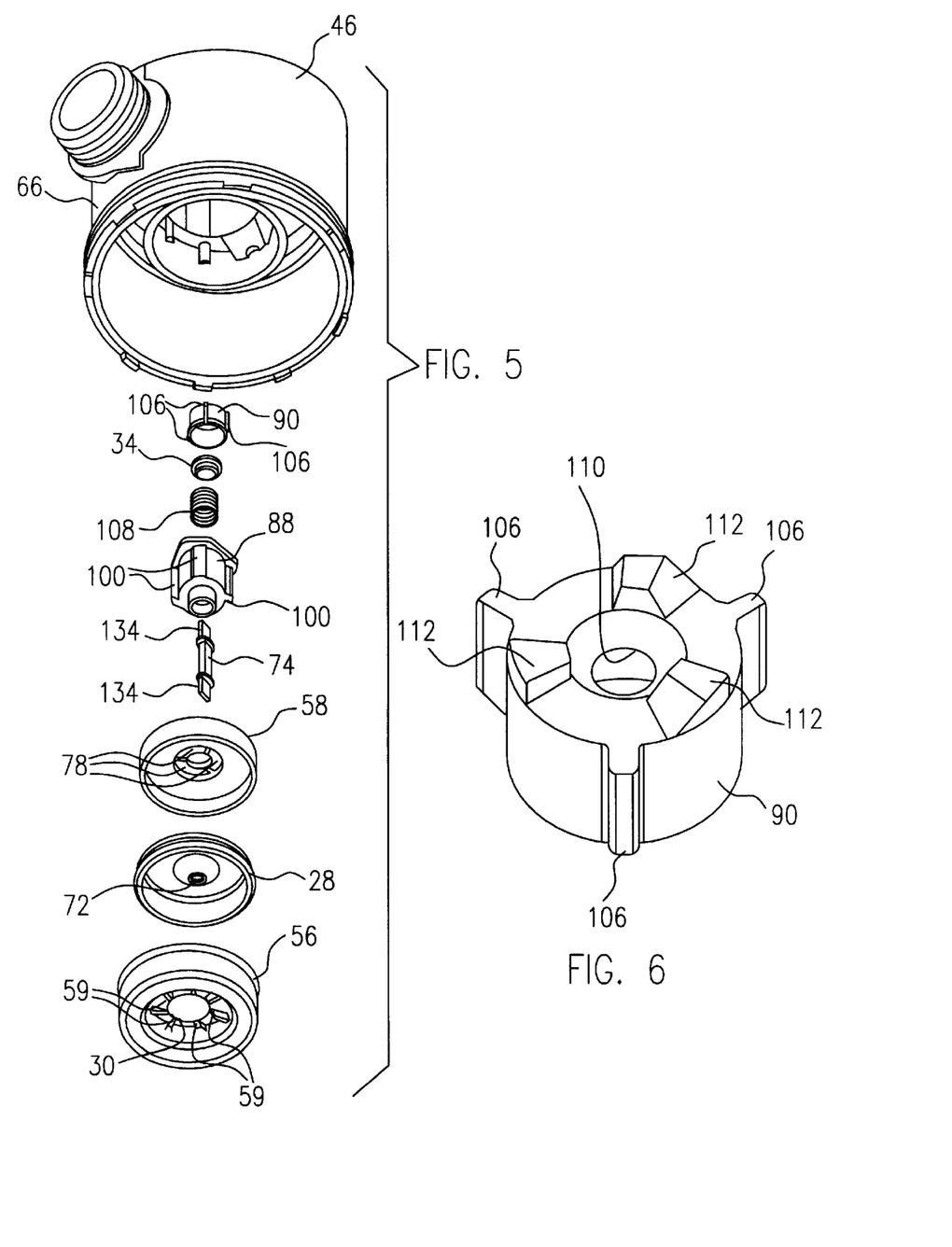
FIG. 5 is an exploded isometric view of valve components of the metering valve.
FIG. 6 is an enlarged isometric view of the pilot valve cam of the metering valve.

Cam portions 112 are formed on the upper surface of the cam 90 as best seen in FIG. 6. Opposed, similar and complementary cam portions 114 (FIG. 2) are formed on the inner surface of the cap 46 around the pilot valve seat 36 and vent passage 60. In the initial closed position of the valve, the cam portions 112 and 114 are not in engagement and the spring 108 holds the pilot valve member 34 against its seat 36. When the pawl rotates the ratchet member 88 and the cam 90, the cam portions 112 and 114 are moved into engagement and force the cam member 90 down to the position seen in FIG. 2 where the pilot valve member 34 is in the open position.

When the main valve member 28 opens in response to opening of the pilot valve member 34, the metering valve 20 delivers an accurately measured, predetermined volume of liquid and then recloses. Liquid flowing through the inlet port 24 moves through a perforated diffuser plate 116 and an orifice plate 118 to the turbine wheel 40. The orifice plate includes outer flow measurement orifices 120 provided in number and size in order to drive the turbine wheel 40 with a desired portion of the total flow. The remaining part of the total flow is diverted through inner bypass orifices 122 for calibration purposes.

Rotation of the turbine wheel 40 resulting from flow of liquid through the metering valve 20 is applied to an input shaft 124 of a gear assembly 126 mounted within a sleeve 127 supported within the body 52. Gear assembly 126 may be of any known design, and serves to reduce the rotation of the input shaft to a smaller rotational output. In the illustrated arrangement, the gear assembly 126 has an output of one revolution in response to about 450 revolutions of the input shaft 124 and turbine wheel.

Figures 4, 7, 8:
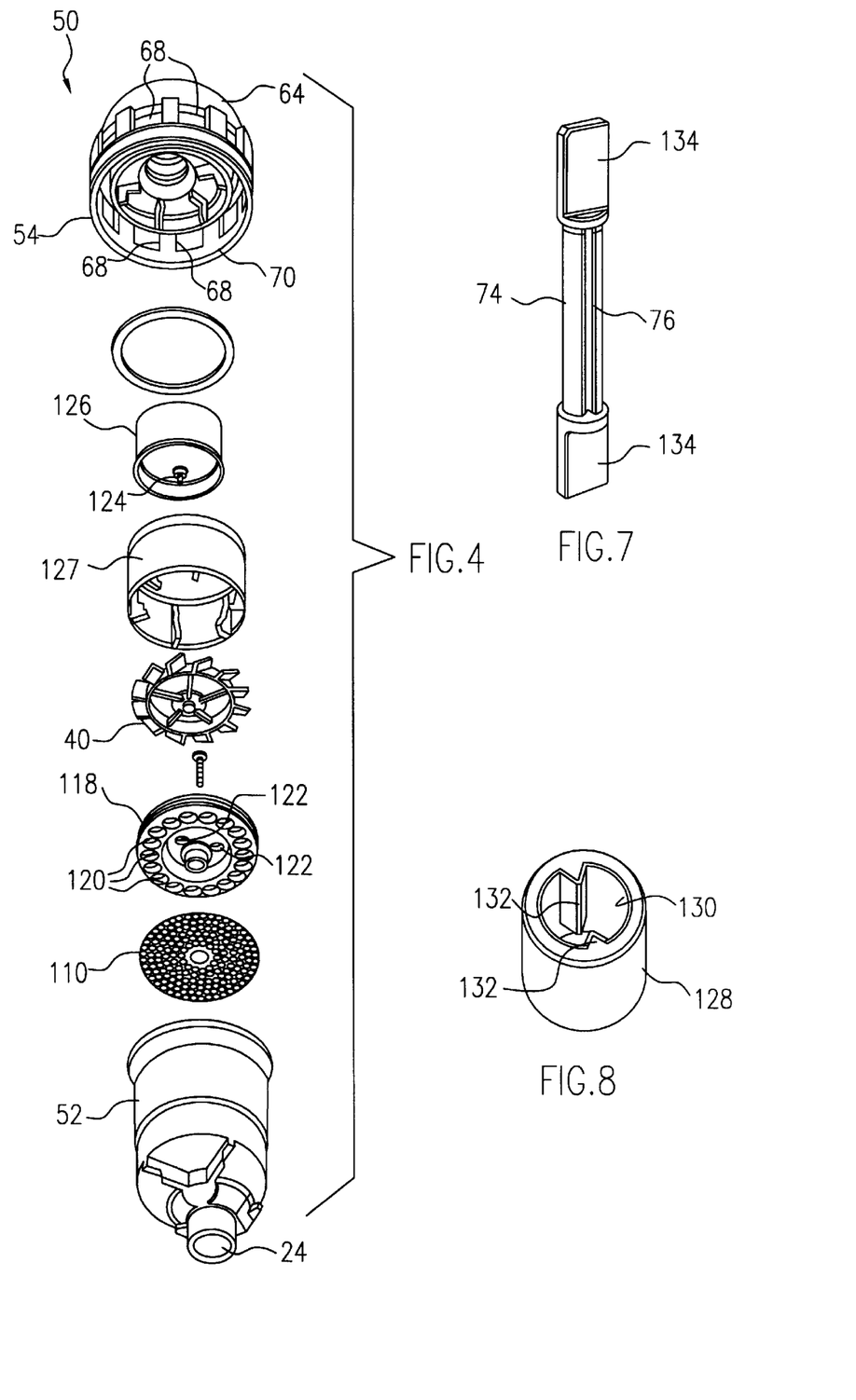
FIG. 4 is an exploded isometric view showing turbine flow measuring components of the metering valve.
FIG. 7 is an enlarged isometric view of the drive shaft of the metering valve.
FIG. 8 is an enlarged isometric view of the gear assembly drive fitting of the metering valve.

The output of the gear assembly is applied with a lost motion connection through the drive shaft 74 to the ratchet member 88 and the pilot valve cam 90. A gear assembly output fitting 128 (FIGS. 2 and 8) is driven by the gear assembly 126 and in turn drives the drive shaft 74. Fitting 128 has a central opening 130 with diametrically opposed drive ribs 132. The drive shaft 74 is provided with a blade or tongue end portion 134 received in opening 130. The blade 134 can rotate more than about one hundred degrees within the fitting 128 before engaging the ribs 132 with a rotational driving connection.

A similar lost motion connection is provided at the upper end of the drive shaft 74 where a second blade end portion 134 is received in an opening 136 of the ratchet member 88. Opening 136 has opposed drive ribs 138 (FIG. 9) also providing a rotational slip fit of more than about one hundred degrees.

The drive shaft 74 has two functions. It serves to transmit rotary motion with a lost motion connection between the gear assembly 126 and the ratchet member 88. In addition, the opposed grooves 76 extending through the orifice 72 of the main valve member 28 provide a restricted flow path that is self cleaning due to the relative axial and rotational movement of the shaft 74 relative to the valve member 28.

An extremely low operating force is required to open the metering valve 20. For the initial portion of the stroke of the pawl 86, the pawl is not in engagement with the ratchet member 88 and the pawl and any mechanism operating the pawl can build kinetic energy. When the pawl engages a ratchet tooth 100, the slip fit, lost motion connection to the drive shaft 74 prevents any significant drag on the ratchet member 88 and minimizes the force required for the pawl to turn the ratchet member 88 and the cam 90. Even when the cam portions 112 and 114 engage to open the pilot valve 34, the operating forces are reduced by the mechanical advantage of the cam system.

Before the pawl actuation, the drive ribs 123 of the gear assembly output fitting 128 are in driving engagement with the drive shaft 74, and the opposite end of the drive shaft 74 is in driving engagement with the drive ribs 138 of the ratchet member 88. When the pawl 86 rotates the ratchet member 88 and cam 90, the drive engagement is uncoupled. As the turbine wheel is rotated by flow through the valve, the drive connection is reestablished by rotation of the output fitting 128. When the ratchet member 88 is rotated about one hundred twenty degrees from its initial position first by the pawl 86 and then by the output fitting 128 acting through the drive shaft 74, the cam portions 112 and 114 move out of engagement, At this point, the pilot valve spring 108 recloses the pilot valve 34 and the main valve member 28 is reclosed.

The turbine wheel 40 is not subject to clogging or plugging in the manner of restricted flow measurement orifices used in other designs. As a result maintenance problems are reduced and accurate flow measurement is obtained. Because running drag on the turbine system is low, the accurate flow measurement is maintained across a wide range of flow rates. The illustrated design has achieved a measurement accuracy of better than plus or minus three percent over a turn down ratio of more than six to one.

While the present invention has been described with reference to the details of the embodiment of the invention shown in the drawings, these details are not intended to limit the scope of the invention as claimed in the appended claims.

What is claimed is:

1. A metering valve comprising:
    a housing defining a flow path including inlet and outlet regions;
    a main valve seat defined in said housing separating said inlet and outlet regions;
    a main valve member movable relative to said main valve seat between open and closed positions;
    said housing defining a control chamber at the side of said main valve member opposite said seat;
    a restricted flow passage extending from said inlet region to said control chamber for normally pressurizing said control chamber to hold said main valve member against said main valve seat in said closed position;
    a pilot valve for selectively releasing pressure from said control chamber to free said main valve member for movement to said open position;
    actuating means for opening and closing said pilot valve;
    a turbine and gear assembly in said inlet region of said flow path, said turbine being rotatable in response to flow in said flow path; and
    a drive shaft extending from said gear assembly through said main valve seat and said main valve member and coupled to said actuating means in said outlet region of said flow path, whereby said drive shaft causes said actuating means to close said pilot valve in response to predetermined rotation of said turbine.

2. A metering valve as claimed in claim 1, said actuating means comprising a cam system connected to said pilot valve, an actuator member, and a pawl and ratchet mechanism connected between said actuator member and said cam system.

3. A metering valve as claimed in claim 1, said actuating means comprising a cam system connected to said pilot valve.

4. A metering valve as claimed in claim 3, said actuating means further comprising an actuating member and a pawl and ratchet mechanism connected between said actuating member and said cam system.

5. A metering valve as claimed in claim 1, said restricted flow passage comprising a pressure flow orifice extending through said main valve member from said inlet region to said control chamber, said drive shaft extending through and restricting said pressure flow orifice.

6. A metering valve as claimed in claim 5 further comprising grooves along said drive shaft.

7. The metering valve of claim 1, wherein said gear assembly is a reduction gear assembly.

8. A metering valve comprising:
    a housing defining a flow path including inlet and outlet regions;
    a main valve seat in said housing separating said inlet and outlet regions;
    a main valve member movable relative to said main valve seat between open and closed positions;
    a control chamber at a side of said main valve member opposite said seat;
    a restricted flow passage extending from said inlet region to said control chamber for normally pressurizing said control chamber to hold said main valve member against said main valve seat in said closed position;
    a pilot valve for selectively releasing pressure from said control chamber to free said main valve member for movement to said open position;
    actuating means for opening said pilot valve;
    a turbine in said flow path rotatable in response to flow in said flow path; and
    a control mechanism coupled between said turbine and said pilot valve for reclosing said pilot valve in response to predetermined rotation of said turbine;
    said restricted flow passage comprising a pressure flow orifice extending through said main valve member from said inlet region to said control chamber, said control mechanism including a rotating drive shaft extending through and restricting said pressure flow orifice, further comprising grooves along said drive shaft.

9. A metering valve comprising:
    a housing defining a flow path including inlet and outlet regions;
    a main valve seat in said housing separating said inlet and outlet regions;
    a main valve member movable relative to said main valve seat between open and closed positions;
    a control chamber at a side of said main valve member opposite said main valve seat;
    a flow passage extending from said inlet region to said control chamber for normally pressurizing said control chamber to hold said main valve member against said main valve seat in said closed position;

a pilot valve for selectively releasing pressure from said control chamber to free said main valve member for movement to said open position;

a cam system rotatable to open and close said pilot valve;

a turbine in said flow path rotatable in response to flow in said flow path; and a control mechanism coupled between said turbine and said cam system for reclosing said pilot valve in response to predetermined rotation of said turbine, said control mechanism including a lost motion drive connection.

10. A metering valve comprising:

a housing defining a flow path including inlet and outlet regions;

a main valve in said housing having an open position wherein said main valve allows flow between said inlet and outlet regions and a closed position wherein said main valve prevents flow between said inlet and outlet regions;

a control chamber in said housing adjacent to said main valve so as to cause said main valve to close when pressure is built up in said control chamber, said control chamber being connected to said inlet region by a flow passage;

pressure means for selectively releasing pressure from said control chamber or allowing pressure to build in said control chamber through the flow passage;

a turbine and gear assembly in said inlet region of said flow path, said turbine being rotatable in response to flow in said flow path; and a rotating drive shaft extending from said gear assembly through said main valve and coupled to said pressure means, whereby said rotating drive shaft causes said pressure means to allow pressure to build in said control chamber in response to predetermined rotation of said turbine thereby causing said main valve to close.

11. The metering valve of claim 10, wherein said main valve comprises a main valve seat separating said inlet and outlet regions and a main valve member movable relative to said main valve seat between said open and closed positions.

12. The metering valve of claim 10, wherein said pressure means comprises a pilot valve coupled to a cam system.

13. The metering valve of claim 10, comprising one or more grooves along said drive shaft.

14. The metering valve of claim 10, wherein said gear assembly is a reduction gear assembly.

15. A metering valve comprising:

a housing defining a flow path including inlet and outlet regions;

a metering device in said inlet region for measuring a flow through said inlet region;

a main valve in said housing having an open position wherein said main valve allows flow between said inlet and outlet regions and a closed position wherein said main valve prevents flow between said inlet and outlet regions;

a control chamber in said housing adjacent to said main valve so as to cause said main valve to close when pressure is built up in said control chamber, said control chamber being connected to said inlet region by a flow passage;

a pilot valve for selectively releasing pressure from said control chamber to free said main valve to obtain said open position;

a cam system rotatable to open and close said pilot valve; and a lost motion drive connection between said metering device and said cam system;

wherein said cam system causes said pilot valve to close in response to a predetermined flow measured by said metering device.

16. The metering valve of claim 15, comprising an actuator member and a pawl and ratchet mechanism connected between said actuator member and said cam system, wherein said actuator member when actuated causes said cam system to open said pilot valve.

17. The metering valve of claim 15, wherein said main valve comprises a main valve seat separating said inlet and outlet regions and a main valve member movable relative to said main valve seat between said open and closed positions.

18. The metering valve of claim 15, wherein said metering device comprises a turbine coupled to a gear assembly in said inlet region of said flow path.

19. The metering valve of claim 18, wherein said gear assembly is a reduction gear assembly.

* * * * *